(No Model.)
J. PORTEOUS.
CULTIVATOR.
No. 524,561. Patented Aug. 14, 1894.
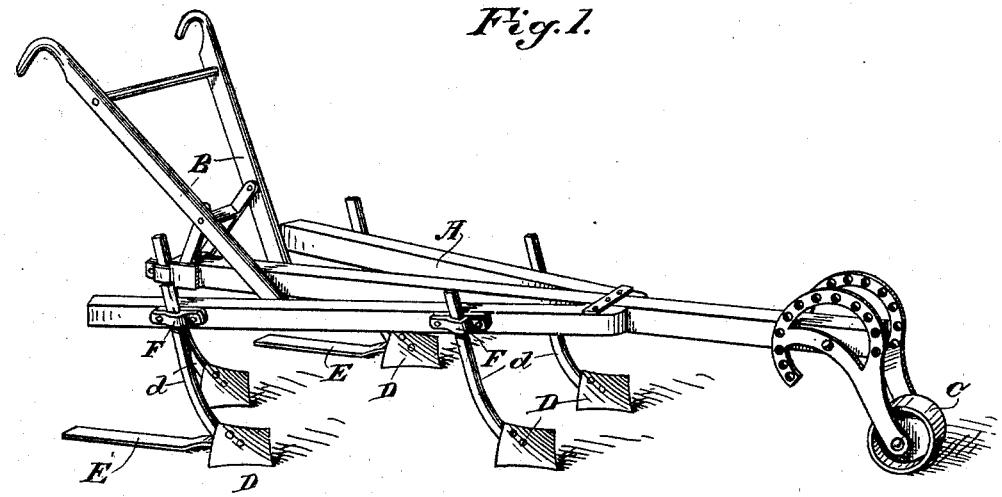
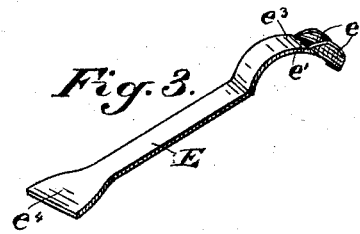
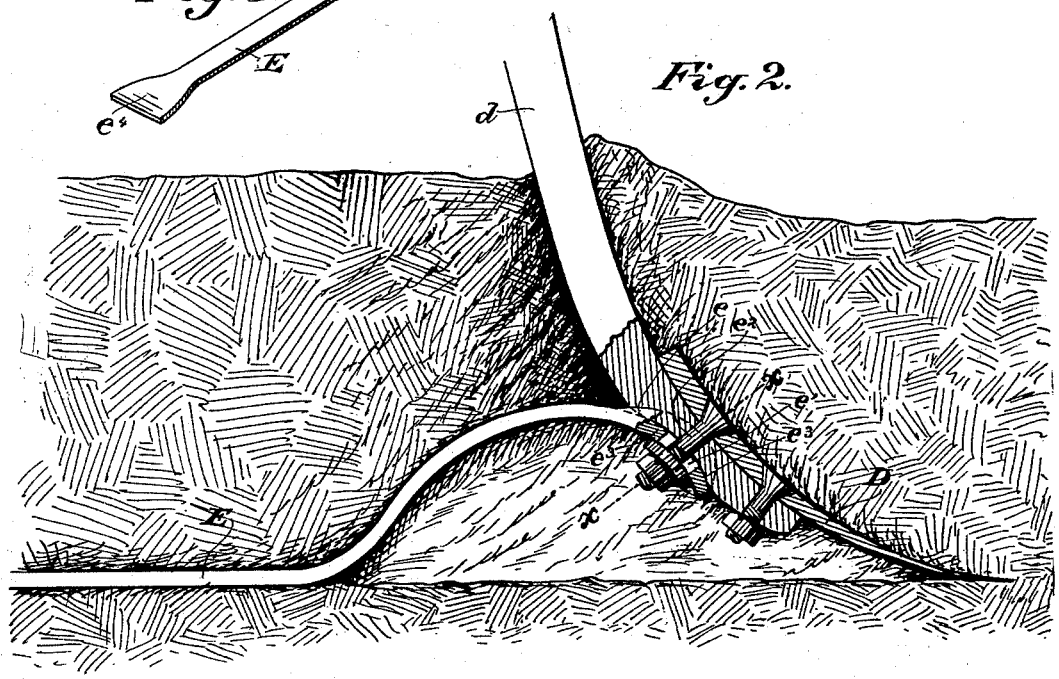
Witnesses,
Inventor,
James Porteous
By Dewey & Co.
Atty.

UNITED STATES PATENT OFFICE.

JAMES PORTEOUS, OF FRESNO, CALIFORNIA.

CULTIVATOR.

SPECIFICATION forming part of Letters Patent No. 524,561, dated August 14, 1894.

Application filed January 10, 1894. Serial No. 496,423. (No model.)

*To all whom it may concern:*

Be it known that I, JAMES PORTEOUS, a citizen of the United States, residing at Fresno, Fresno county, State of California, have invented an Improvement in Cultivators; and I hereby declare the following to be a full, clear, and exact description of the same.

My invention relates to the class of cultivators and especially to that sub class known as vineyard or orchard cultivators.

My invention consists in the novel means for guiding and steadying the cultivator, a result which is particularly desirable in implements used in vineyards and orchards where it is necessary to cultivate close to the vines and trees, for in such cases it is of the greatest importance to steady and guide the implement to avoid contact and consequent injury to the vines and trees.

Although my invention is applicable to cultivators of various shapes and kinds, I have herein illustrated it in connection with a well known form of cultivator.

Referring to the accompanying drawings for a more complete explanation of my invention,—Figure 1 is a perspective view of a cultivator showing my guiding and steadying bar. Fig. 2 is a view showing the guiding and steadying bar embedded in the ground and traveling in the path of the shovel, to the shank of which it is shown adjustably connected. Fig. 3 is a view showing a widened end for said guiding or steadying bar. Fig. 4 is a section on line $x$—$x$ of Fig. 2.

A is the frame, B the handles, C the front wheel, D the shovels, and $d$ the shanks of a cultivator. A guide bar E extends directly back from the shovel, and in its normal position lies in practically the same horizontal plane as said shovel, its rear portion or body being flat and about in the plane of the point of the shovel. In practice I employ two of these guide bars, one on each side, and extending rearwardly from the rearmost shovels.

In operation, as I have shown, the shovel is embedded in the ground, the surface of which is well up upon the shank. The guide bar E is also embedded in the ground to the same depth that the shovel is, and it being directly behind, it travels in the open path formed by the shovel so that it is not in any way an impediment to the travel of the implement, nor does it increase the draft. Being deep in the ground, it is below weeds and débris in which particular it is more advantageous than any device which travels on or partly cuts into the surface of the ground. Such devices are open to the objection of meeting with obstructions and impediments of all kinds, weeds and débris, but my guide bar, as before stated, being embedded in the ground, does not meet with such obstructions. Extending rearwardly and being completely embedded in the ground, it serves to effectively guide and steady the cultivator, which being light, has a tendency to unsteadiness, both sidewise and vertically, rendering it liable to injure trees and vines in proximity to which it passes and difficult to manage. But with my guide this tendency is obviated, and the whole cultivator rendered as steady and true running as desirable.

The rearwardly extending guide bar E may be connected in any suitable manner. In practice this connection is with the base of the shank as this dispenses with any extra piece which would be an obstruction, and while it may be a rigid connection, the best form is an adjustable connection which will adapt it to be raised or lowered as occasion may require. In loose and ashy soils which are soft in their nature the tendency of the shovel is to suck downwardly, and in such cases, by lowering the rear end of the guide bar slightly, it will bear within the ground with sufficient force to overcome this tendency of the shovel and to keep it well up. In firmer ground the guide bar can be raised to lie flat and flush with the shovel so that it will guide it straight and true. This adjustable connection may be of any suitable character, but the best and simplest form is that here shown, in which the forward extremity of the guide bar is provided with side lips $e$ inclosing a slightly convex surface $e^3$ which bears in a correspondingly concave surface of the shank, thus enabling the bar to be rocked up and down thereon. The bar is provided at this convex extremity with an elongated slot $e'$ through which a single securing bolt $e^2$ passes, receiving a nut and washer underneath. By tightening this nut, the guide bar will be held steady, and by loosening it, it may be lowered or raised at its rear extremity and again tightened. The shanks $d$ are secured to the frame beams of the cultivator in any suitable manner. I have here shown them as passing between clamps F bolted to the sides of the frame bars, and in which said shanks may be vertically adjusted.

The guide bar E, if desirable may have a widened rear end $e^4$ as shown in Fig. 3 to increase its holding capacity in the ground.

Having thus described my invention, what I claim as new, and desire to secure by Letters Patent, is—

1. In combination with the shovel and shank of a cultivator, a means for guiding and steadying the cultivator, and preventing its vertical jumping movement, consisting of a bar having its forward end connected with the base of the shank, and its rear extending portion turned to present a broad flat surface to the ground.

2. In combination with the shovel and shank of a cultivator, a bar secured at its forward end to the base of the shank and having its opposite portion extending rearwardly, said rear portion adapted to be embedded deeply in the ground and made flat and widened at its rear end, whereby the cultivator is guided and steadied in its movements, and prevented from jumping vertically.

3. In combination with the shovel and shank of a cultivator, a means for guiding and steadying the cultivator and holding the same against a vertical movement consisting of a bar having its forward end made convex and flanged and adapted to fit a concaved seat in the shank, and provided with an elongated slot, and a single securing bolt passing through the slot to secure the bar in place, said bar having its rear portion flat to form a broad bearing surface adapted to be embedded deeply in the ground.

In witness whereof I have hereunto set my hand.

JAMES PORTEOUS.

Witnesses:
   S. H. NOURSE,
   H. F. ASCHECK.